US008101075B2

(12) United States Patent
Montelauro

(10) Patent No.: US 8,101,075 B2
(45) Date of Patent: Jan. 24, 2012

(54) FLUID FILTER CARTRIDGE ASSEMBLY

(75) Inventor: Christopher P. Montelauro, Bowling Green, OH (US)

(73) Assignee: FRAM Group IP LLC, Danbury, CT (US)

( * ) Notice: Subject to any disclaimer, the term of this patent is extended or adjusted under 35 U.S.C. 154(b) by 1053 days.

(21) Appl. No.: 11/970,424

(22) Filed: Jan. 7, 2008

(65) Prior Publication Data

US 2008/0164205 A1 Jul. 10, 2008

Related U.S. Application Data

(60) Provisional application No. 60/883,725, filed on Jan. 5, 2007.

(51) Int. Cl.
*B01D 35/00* (2006.01)

(52) U.S. Cl. ......... 210/232; 210/437; 210/439; 210/443

(58) Field of Classification Search .................. 210/232, 210/416.1, 437, 438, 439, 443, DIG. 17
See application file for complete search history.

(56) References Cited

U.S. PATENT DOCUMENTS

| | | | | |
|---|---|---|---|---|
| 5,556,542 | A * | 9/1996 | Berman et al. | 210/232 |
| 5,695,633 | A * | 12/1997 | Ernst et al. | 210/130 |
| 6,096,207 | A | 8/2000 | Hoffman, Jr. et al. | |
| 6,679,990 | B2 * | 1/2004 | Reinhart | 210/232 |
| 6,814,243 | B2 * | 11/2004 | Amstutz et al. | 210/457 |

FOREIGN PATENT DOCUMENTS

| | | |
|---|---|---|
| EP | 00929355 B1 | 3/1998 |
| WO | WO99/65832 | 12/1999 |

OTHER PUBLICATIONS

International Search Report Dated Jun. 18, 2008, International Application No. PCT/US2008/050429.

Written Opinion of International Searching Authority Dated Jun. 18, 2008, International Application No. PCT/US2008/050429.

* cited by examiner

*Primary Examiner* — Fred Prince

(74) *Attorney, Agent, or Firm* — Cantor Colburn LLP

(57) ABSTRACT

A filter assembly, comprising: a housing defining an inner cavity; a mounting member formed with the housing, the mounting member having at least one feature for engaging a feature of a center tube of a removable filter cartridge being configured to be removably inserted into the housing, wherein the at least one feature engages the feature of the center tube as the filter assembly rotates therein.

14 Claims, 3 Drawing Sheets

FLUID FILTER CARTRIDGE ASSEMBLY

CROSS REFERENCE TO RELATED APPLICATIONS

This application claims the benefit of U.S. Provisional Patent Application Ser. No. 60/883,725 filed Jan. 5, 2007, the contents of which are incorporated herein by reference thereto.

BACKGROUND

Exemplary embodiments of the present invention relate to a filter for a fluid and a method for making/using the same.

Liquid filters are provided to remove contaminants from a fluid being circulated through a flow path. Non-limiting examples, include oil, fuel and coolant filters, wherein the filter is configured to have a flow path therethrough, wherein the filter has an inlet opening or openings and an outlet opening with filtration media disposed therein.

In general a filter comprises a housing for the filtration media as well as a means for defining the flow path wherein fluid to be filtered enters into the filter passes through the filter media and then the filtered fluid exits out through an outlet opening. As may be expected, a filter may comprise multiple components to ensure the fluid being filtered passes through the media and out through the outlet opening.

As the fluid is filtered, the filter media traps particulates and ultimately needs replacing in order to maintain a desirable flow of fluid through the filter. Since the filter media is typically the main component needing replacement it is desirable to provide a filter wherein the filer media is separable from the housing wherein new media may be installed therein. Moreover, it is desirable to provide a filter media that can be easily disposed of.

Accordingly, it is desirable to provide a filter wherein a filter media cartridge is easily removed, replaced and disposed of while the filter housing is reused.

SUMMARY OF THE INVENTION

In accordance with an exemplary embodiment of the present invention, a filter assembly is provided, the filter assembly comprising: a housing defining an inner cavity; a mounting member formed with the housing, the mounting member having at least one feature for engaging a feature of a center tube of a removable filter cartridge being configured to be removably inserted into the housing, wherein the at least one feature engages the feature of the center tube as the filter assembly rotates therein.

In another exemplary embodiment of the present invention a filter cartridge for removable securement to an open ended filter housing is provided, the filter cartridge comprising: a filter constructed from a filter media, the filter having an inner opening and an exterior filter surface; and a center tube/end cap assembly disposed on one end of the filter, the center tube/end cap assembly having an end cap and a center tube with a plurality of openings, the end cap being secured to one end of the filter media and the center tube is received within the inner opening of the filter, the center tube providing fluid communication from the inner opening to an opening of a neck portion extending from the end cap of the center tube/end cap assembly, the center tube further comprising a distal end recessed within the inner opening of the filter, the distal end having at least one slotted opening.

In still another exemplary embodiment, a method for securing a removable filter cartridge to a filter housing is provided, the method comprising: inserting the removable filter cartridge into the housing; aligning at least one feature of a distal end portion extending from a mounting member of the filter housing in at least one opening of an end portion of a center tube of a center tube/end cap assembly by rotating the filter cartridge in the housing, the end portion of the center tube being recessed within an opening of a filter media of the removable filter cartridge.

The above-described and other features are appreciated and understood by those skilled in the art from the following detailed description, drawings, and appended claims.

DETAILED DESCRIPTION OF EXEMPLARY EMBODIMENTS

In accordance with exemplary embodiments of the present invention, a filter assembly, filter and method of using/replacing the filter is disclosed herein. The filter assembly being configured to be used to filter any type of fluid requiring filtration in a fluid circulating system non-limiting examples of such fluids and fluid systems include oil, fuel, coolants, water or any other type of fluid.

Figure 6:
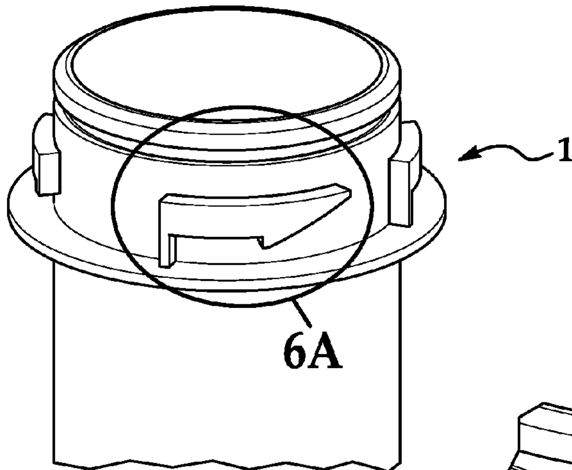
FIGS. 6 and 6A illustrate an enlarged perspective view of portions of the housing of an exemplary embodiment of the present invention.
Figure 6A:
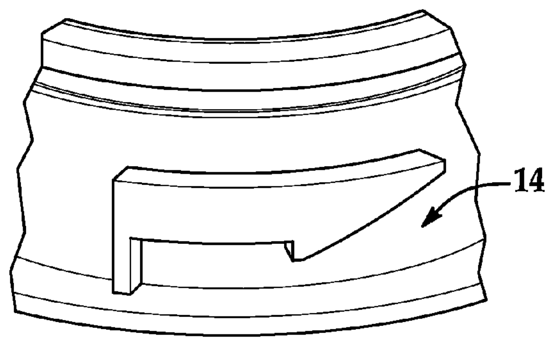

Referring now to the Figures and in accordance with exemplary embodiments of the present invention a filter assembly 10 is provided. The filter assembly 10 will comprise a housing 12 having a feature or bayonet feature or features 14 (see also FIGS. 6 and 7) configured to engage complimentary features of a head member of a fluid system to which the filter housing is installed. Inserted in the housing is a removable filter cartridge 16 having a filter media portion 18, a center tube/end assembly 20 and an end plate portion or end cap 22. In an exemplary embodiment of the present invention, the filter media portion 18 comprises filter media configured to have an exterior filtration surface bounded on either end by end caps and defining an internal cavity that receives the center tube therein. Non-limiting examples of the type of filter media include a layer or a plurality of layers of media (e.g., non-woven materials) non-limiting examples of the non-woven media include but are not limited to synthetic and cellulose based non-woven media(s) and combinations thereof as long as the desired filtration of the fluid is performed by the media.

Figure 7:
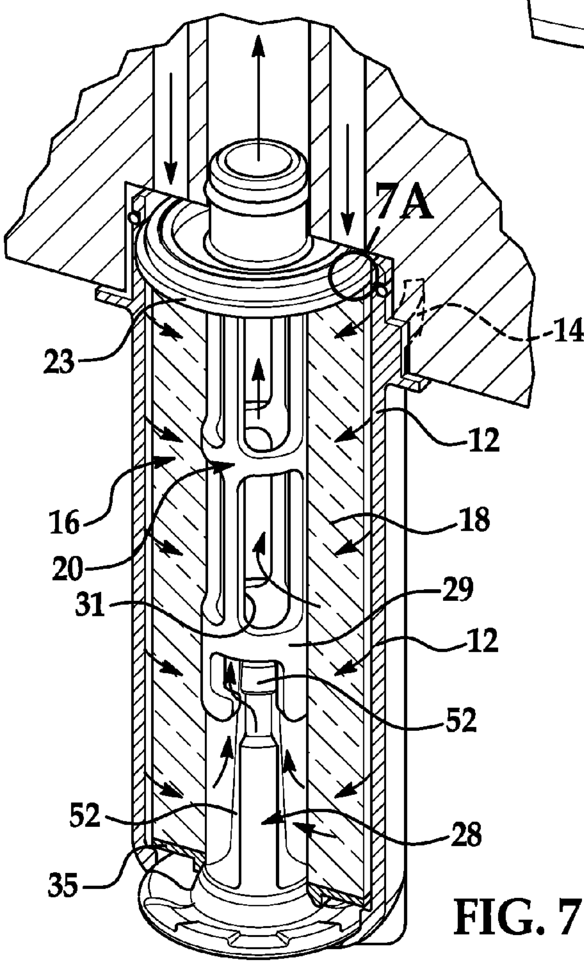
FIG. 7 is a partial perspective cross-sectional view of the filter assembly of an exemplary embodiment of the present invention secured to a head member of a fluid system having the fluid to be filtered by an exemplary filter assembly of the present invention.

In one exemplary embodiment, the center tube/end assembly has an end cap portion 23 disposed on one end of the filter media and within the opening of the housing that is proximate to features 14 of the housing and a periphery of the end cap portion 23 is spaced from an inner wall of the housing (FIG. 7A) such that fluid to be filtered by the filter flows into the filter housing through the top opening in the housing around the periphery of the end cap portion 23 and through the exterior surface of the filter media 18, through the filter media into a central opening of the media, into the center tube of the center tube/end assembly and out through an opening 25 of a neck portion 27 of the center tube/end assembly extending from end cap portion 23. In accordance with an exemplary embodiment neck portion 27 is configured to fluidly couple to a complimentary opening of the fluid system by being inserted into the opening when the feature 14 engages a feature of the head portion and a seal is made via an O-ring disposed in a groove on the outer periphery of the neck portion. One non-limiting example is illustrated in FIG. 7. Of course, other contemplated means for sealing the neck portion to the system are contemplated to be within the scope of exemplary embodiments of the present invention.

In accordance with an exemplary embodiment of the present invention the center tube assembly has a central portion or center tube portion 29 with a plurality of apertures 31 that is positioned in a center opening 33 of the filter media, so that filtered fluid being received in the top opening of the housing is filtered by media 18 and then received in through the openings of the center tube and travels out through opening 25.

In accordance with an exemplary embodiment of the present invention a bottom portion of the central portion of the center tube is positioned within the center cavity of the filter media and is configured to have a slot or feature 24 configured to engage protrusions or features 26 of a mounting member 28 secured to the housing.

In one non-limiting exemplary embodiment, mounting member 28 is integrally formed with housing 12 (e.g., formed during the same molding process). Alternatively, mounting member 28 is separately formed and insert molded with housing 12. In yet another alternative the mounting member is welded or glued to the housing. In any of the aforementioned embodiments, the mounting member is integral or secured to the housing.

In accordance with an exemplary embodiment of the present invention the mounting member is integrally formed with the housing and also has a plurality of features 30 configured to engage a plurality of features 32 of a surface 35 of end cap 22 disposed on the end of the filter media opposite to end cap 23. In accordance with an exemplary embodiment and in order to provide a fluid seal between the surface 35 of end cap 22 and the mounting member 28, a base portion 40 of the mounting member has a chamfered or angled surface 42 configured to mate with and seal to a complimentary chamfered or angled surface 44 disposed about a periphery of an opening 46 into which a portion of the mounting member is received.

In addition, the features 30 of the base portion of the mounting member are configured to mate with complimentary features 32 on surface 35 of end cap 22 such that a keyway between the two items is provided such that a means to ensure the proper filter cartridge is associated with a particular housing is provided. For example, filter housings of various sizes and/or applications will require filter cartridges of various sizes (e.g., height, width, external periphery, media type, etc.) and accordingly, features 30 of a particular housing will be configured to mate or match with features 32 of the end cap 22. Accordingly, each housing through features 30 can be specifically configured for receipt of a particular type of filter cartridge so that the proper cartridge is inserted into the housing. Non-limiting examples include filter cartridge media types (e.g., oil, fuel, coolant, water and any other type of fluid) and/or filter cartridge size for the particular housing it is secured to, which may be dependent upon the type of fluid system and/or the capacity of the system.

Alternatively and as will be discussed herein, the features 26 and the configuration of the slots 24 of the center tube will either also provide the keyway or are the only means for providing the keyway (e.g., surface 35 of end cap 22 and a corresponding surface of the mounting member do not provide the keyway function).

In addition and discussed above, the end plate and the mounting member will also have chamfered or angled surfaces in order to guide the filter cartridge into a proper location with respect to the mounting member and ultimately the filter housing. In addition, the chamfered surfaces of the end plate and the mounting member will also provide a fluid tight seal therebetween. Thus and once inserted into the housing, both end caps seal off either end of the filter media and the fluid to be filtered must travel through the media into the central opening 33 of the filter media and then the filtered fluid is received into the center tube and through opening 25 and into the fluid system to which the filter is secured.

In one non-limiting embodiment, both the end cap and the mounting member are constructed from a plastic material to ensure an interface therebetween. Moreover, the types of materials selected for both the end cap and the mounting member may be different as long as the coefficient of friction between them is low enough to ensure proper fitting of the cartridge into the housing. Alternatively, other equivalent types of materials can be used for the end caps or one of the end caps (e.g., cellulose based materials).

Moreover, the filter cartridge and through the use of these chamfered or angled features the end cap and accordingly the filter cartridge is self centered by the features of the end cap and the mounting member.

Thus and once the filer cartridge is inserted in the housing, and the housing is secured to the head or system fluidly coupled to the fluid to be filtered the filter cartridge is centered and sealed to the housing. Accordingly, and once the filter is secured to the system and as unfiltered fluid travels into the housing around the periphery of the end cap 23 of the center tube/end assembly, through the media into the center tube through apertures disposed therein and out the opening of the center tube adjacent the end cap of the center tube/end assembly.

In accordance with an exemplary embodiment the bayonet feature 14 on housing 12 and complimentary features on the head/interface locks the filter housing to the head by simply rotating the same to engage complimentary features of the head the filter housing is secured to.

This design also guides the housing into the fluid interface on the head/manifold upon installation (e.g., opening 25 of the neck portion is received within the fluid system inlet and the chamfered features center and seal the filter cartridge into the housing). The locking mechanism of the housing is unlocked by pushing up on the housing and rotating it in the opposite direction for sealing the housing to slide the tooth or feature of the head out of the bayonet.

Furthermore during removal of the housing from the head and as the housing is rotated clockwise with respect to the filters shown in the figures (e.g., to disengage features 14), the features 26 of the mounting member engage the horizontal portion of the slot 24 of the center tube such that the feature(s) 26 is/are no longer aligned with a vertical open end portion of the slot 24 (FIG. 3) and as the housing is pulled down in the direction of arrow 34 the filter will be pulled down along with any fluid (e.g., oil, fuel, etc) entrained therein. During this movement, the neck portion 27 is removed from the fluid system.

Figure 1:
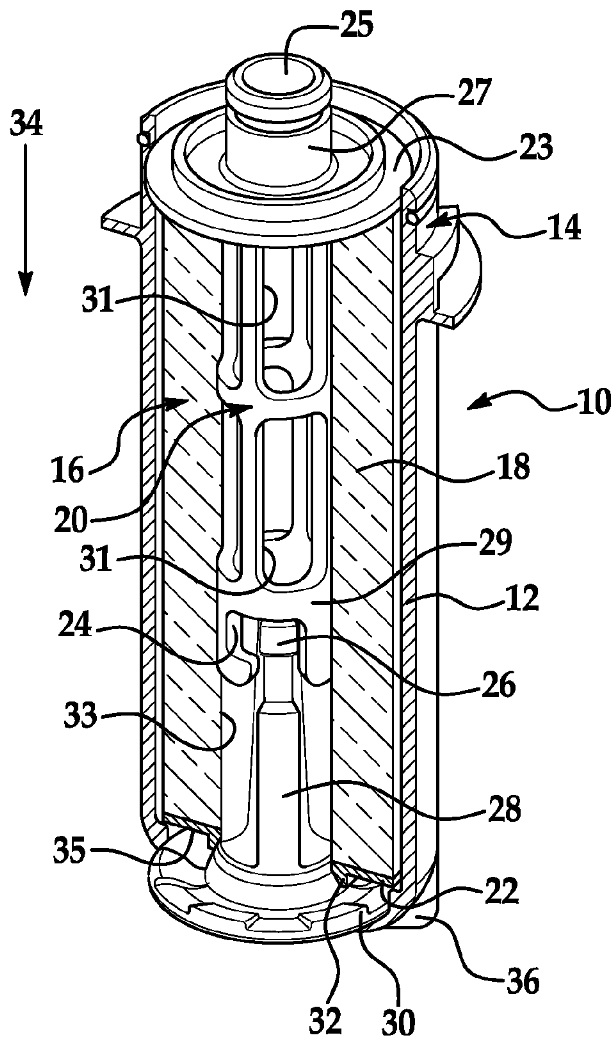
FIG. 1 is a partial perspective cross-sectional view of an exemplary embodiment of the present invention.
Figure 2:
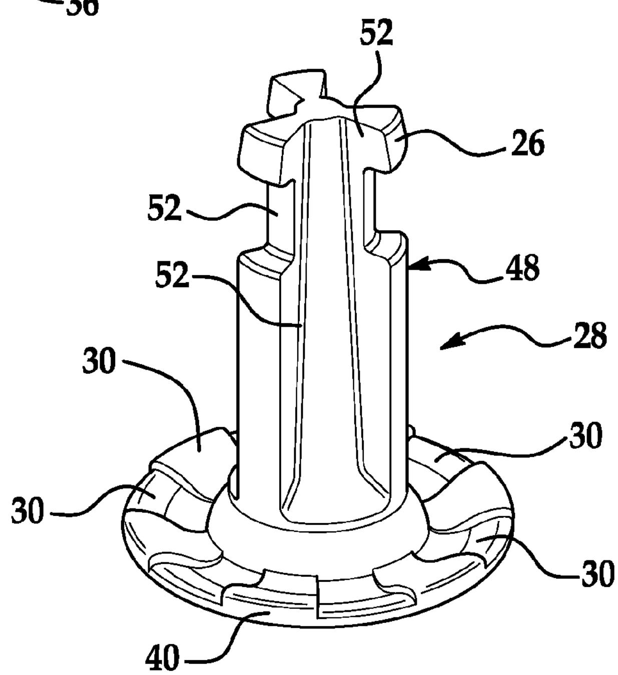
FIG. 2 is a perspective view of a portion of the housing of a filter in accordance with an exemplary embodiment of the present invention.
Figure 4:
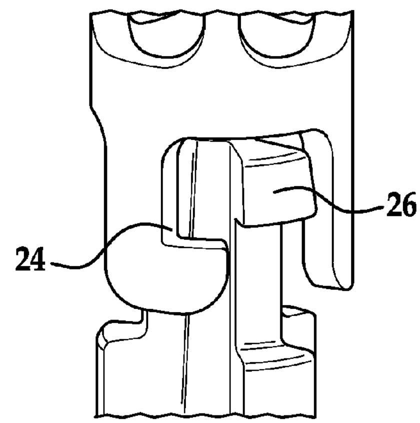
Figure 5:
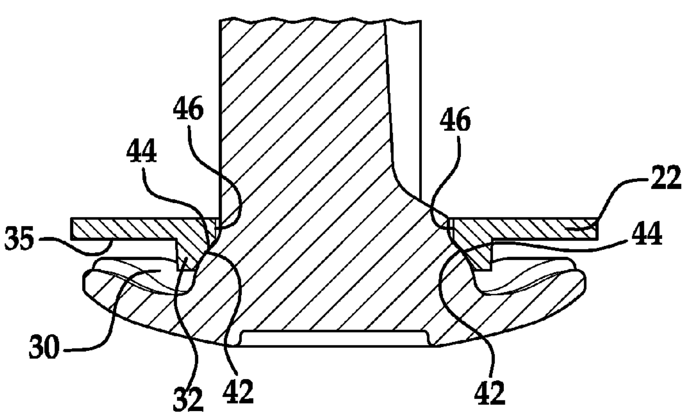
FIG. 5 is a partial cross-sectional view of a portion of a housing in accordance with an exemplary embodiment of the present invention.

Once the housing is removed, the filter cartridge is rotated, by accessing the open end of the housing, in a direction opposite to the direction for removal of the housing such that the feature 26 is aligned with the vertical portion of the slot to allow the filter cartridge to be removed from the housing. This position of the feature in the slot is illustrated in FIGS. 1 and 4.

As used herein, vertical and horizontal are used to coincide with the orientations in FIGS. 1-6, of course and as applications may require, these orientations may vary as long as rotational movement of the housing to remove it from the head portion causes the feature 26 to be positioned in a portion of the slot 24 such that movement of the housing in the direction of the arrow 34 causes the filter cartridge to be removed with the housing.

Figure 3:
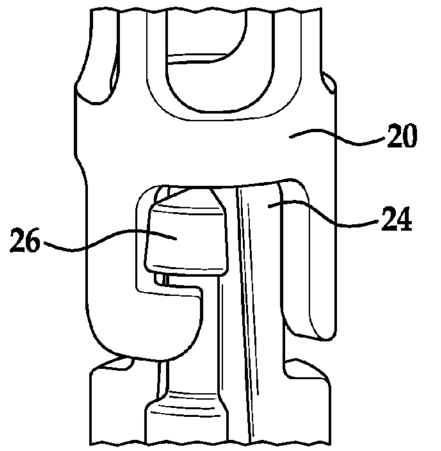
FIGS. 3 and 4 illustrate engagement of the filter cartridge and a portion of the housing in accordance with an exemplary embodiment of the present invention.

In one non-limiting exemplary embodiment, the degrees of rotation of the housing with respect to the filter cartridge to engage and disengage the features of the center tube and the mounting member (e.g., features 26 positioned or aligned to be pulled from slot or opening 24) are less than the degrees of rotation to disengage/engage the bayonet to the head. In other words and in order to remove the housing the same must be rotated a predetermined distance or amount of rotation to disengage the features 14 however any amount of movement sufficient to disengage housing 14 will cause features 26 to be positioned in the horizontal portion of the slot 24 such that downward forces will remove the filter cartridge. This would be attributed to neck portion 27 frictionally engaging the inner surface of the complimentary opening of the head of the fluid system the neck portion is received. It being understood that both slot 24 and features 26 and 14 are configured such the rotation to remove features 14 from a head will rotate feature 26 into the horizontal portion of slot 26 (FIG. 3).

In another exemplary embodiment, the housing is configured to have a foot feature or features 36, which allows the housing to stand upright on a planar surface during removal of the cartridge. This allows for ease of oil or other fluid disposal and/or recycling in addition to ease of removal and replacement of the filter cartridge since the housing will be upright and the open end of the housing is accessed to remove the cartridge.

In one non-limiting exemplary embodiment, the features or protrusions 26 protrude from a pedestal portion 48 extending upward away from the base portion 40 of the mounting member.

In accordance with an exemplary embodiment of the present invention and as illustrated in the figures the pedestal portion may comprise a plurality of features 26 each configured to engage a plurality of slots 24 disposed on an end of the center tube. Although three features are shown requiring three slots, numerous configurations are contemplated. For example, and in accordance with an alternative exemplary embodiment of the present invention, the mounting member may comprise a single feature 26 for engaging a single slot 24. Once again, it being understood that the features 26 and the slots 24 can provide the keyway for ensuring the correct filter is inserted into the housing.

In addition and as illustrated, the end of the center tube comprising the slots is recessed within opening 33 and pedestal 48 extends away from base portion 40 a sufficient length to reach the slots when the cartridge is inserted into the housing. Also, the three features 26 at the end of the pedestal are orientated to be received and removed from the vertical portion of the slot 26 in order to provide the key way or interlocking features as discussed above such that only the correct filter (e.g., size, type, etc.) can be received within the housing. These features may be used in conjunction with features 30 and 32 in order to provide the keyway or interlocking features.

Alternatively, mounting member 28 is only configured to have features 26 for keyway and interlocking of the filter cartridge to the housing and chamfered features or surfaces 42 for engaging chamfered features or surfaces 44 of the opening 46 of the end cap 22.

Furthermore and since the pedestal portion of the mounting member containing the features 26 extends into the inner opening of the filter media the pedestal portion also has features or channels 52 to allow filtered fluid to be directed from a bottom portion of the filter media below features 26 and above end cap 22 to be filtered by the media received into channels 52 and ultimately into the center tube and out through opening 25. Thus, the pedestal portion extending into the filter media does not impede the filtering of the fluid or in other words channels 52 are spaced from the inner surface of the media defining inner opening 33 to provide fluid paths therethrough.

In yet another alternative exemplary embodiment, features 30 of the base portion and features 32 of the end cap are also employed to provide the keyway or interlocking feature to secure the filter cartridge thereto.

In accordance with an exemplary embodiment of the present invention and in order to remove the used cartridge assembly after the housing has been removed from the head of the fluid system the filter is secured to, a user simply rotates the filter assembly in housing 12 until the slot or slots 24 no longer engages feature or features 26 and the filer cartridge comprising the filter media portion, the center tube end/end assembly and the end plate portion can be slid out of the housing. In accordance with an exemplary embodiment the filter cartridge is made of materials that can be incinerated. Thus, an eco-friendly filter cartridge is provided. Thereafter, a user simply installs a new cartridge and then secures the housing to the head. Here the replacement cartridge will have to have a center tube end configuration and end cap configuration that matches the features of the mounting member in accordance with an exemplary embodiment of the present invention in order to replace the filter cartridge.

Exemplary embodiments of the present invention provide unique solutions to at least three problems. 1) sealing of the bottom of the cartridge to the housing to prevent dirty oil/fuel from by-passing the filtration element of the filter; 2) self-centering of a filter cartridge to a housing during installation and filter housing mounting; and 3) a mechanism to lock cartridge to the housing upon disassembly of housing from head/manifold to make it easier to dispose of used filter and used oil or fuel.

This design solves the three problems in the following manner. It provides a cone on spheroid sealing surface between the housing and cartridge that prevents dirty oil/fuel from by-passing the filtration element of the filter. It self-centers the cartridge into a filter housing a centering feature or features in the housing. It locks the cartridge to the housing (via rotation) such that upon removal of the housing from a system using rotation causes the cartridge to be released with the housing for easier disposal of the used cartridge and used oil by use of a tab and slot design on the center tube and centering device. This tab and slot design also allows the cartridge to be removed from the housing by unlocking it from the housing after housing removal through a rotation of the cartridge with respect to the housing in an opposite direction used for releasing the housing from a fluid system. In other words, the removal of the housing from the system locks the filter cartridge therein and once removed opposite rotation of the cartridge within the housing unlocks the cartridge.

In addition, the aforementioned features are used to ensure the correct filter cartridge is inserted into the housing as a similar looking filter cartridge with the incorrect media will be prevented from being inserted into the housing since the end portion of the center tube will not match the features 26 of the mounting member. Alternatively and in another embodiment, features 30 are used to ensure the correct filter cartridge is inserted therein.

Figure 7A:
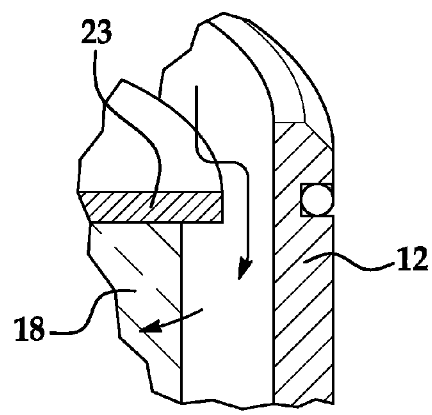
FIG. 7A is an enlarged view of FIG. 7.

FIGS. 7 and 7A show schematic views of the filter assembly of an exemplary embodiment of the present invention secured to a head member of a fluid system having the fluid to be filtered by an exemplary filter assembly of the present invention. FIG. 7A illustrates the fluid flow around end cap 23 and into media 18.

In accordance with an exemplary embodiment of the present invention plastic materials are contemplated for use with the centering device or mounting member and the filter cartridge end discs to allow for incineration of the cartridge.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filter assembly, comprising:

a housing defining an inner cavity;

a mounting member formed with the housing, the mounting member having at least one feature for releasably engaging at least one feature of a center tube of a removable filter cartridge configured to be removably inserted into the housing, the at least one feature engages the feature of the center tube as the filter cartridge rotates therein, wherein the mounting member has a base portion and a pedestal portion extending therefrom, the at least one feature being formed on the pedestal portion and wherein the at least one feature is a protrusion and the at least one feature of the center tube is a slotted opening disposed within a central cavity of the filter cartridge, the slotted opening being recessed within the central cavity.

2. The filter assembly as in claim 1, wherein the end cap and center tube is plastic and the housing has a foot feature that allows the housing to stand upright on a planar surface.

3. The filter assembly as in claim 1, wherein the removable filter cartridge further comprises an upper end cap portion and a lower end cap portion, the lower end cap portion having a plurality of features for engaging and sealing with complimentary features of a base portion of the mounting member to align and seat the filter cartridge within the housing.

4. The filter assembly as in claim 1, wherein the slotted opening has vertical portion and a horizontal portion.

5. A filter assembly, comprising a housing defining an inner cavity;

a mounting member formed with the housing, the mounting member having at least one feature for releasably engaging at least one feature of a center tube of a removable filter cartridge configured to be removably inserted into the housing, the at least one feature engages the feature of the center tube as the filter cartridge rotates therein, wherein the removable filter cartridge further comprises an end cap having a chamfered surface for engaging and sealing with a complimentary chamfered surface of the mounting member to provide a seal therebetween and wherein the mounting member has a base portion and a pedestal portion extending therefrom, the at least one feature for engaging the at least one feature of the center tube being formed on a distal end of the pedestal portion and complimentary chamfered surface of the mounting member being formed on the base portion of the mounting member.

6. The filter assembly as in claim 5, wherein the at least one feature is a protrusion and the at least one feature of the center tube is a slotted opening disposed within a central cavity of the filter cartridge, the slotted opening being recessed within the central cavity.

7. The filter assembly as in claim 6, wherein the slotted opening has a vertical portion and a horizontal portion and the pedestal portion has a plurality of channels for fluid flowing through the media and into the center tube.

8. A filter cartridge for removable securement to an open ended filter housing, the filter cartridge comprising:

a filter constructed from a filter media the filter having an inner opening and an exterior filter surface; and a center tube/end cap assembly disposed on one end of the filter, the center tube/end cap assembly having an end cap and a center tube with a plurality of openings, the end cap being secured to one end of the filter media and the center tube is received within the inner opening of the filter, the center tube providing fluid communication from the inner opening to an opening of a neck portion extending from the end cap of the center tube/end cap assembly, the center tube further comprising a distal end recessed within the inner opening of the filter, the distal end having at least one slotted opening; and an end cap disposed on an opposite side of the filter from the end cap of the center tube/end cap assembly, the end cap having an opening aligned with the inner opening and the opening having a chamfered surface disposed about the periphery of the opening of the end cap.

9. The filter cartridge as in claim 8, wherein the center tube/end cap assembly and end cap are formed from a plastic material and the at least one slotted opening has a vertical portion and a horizontal portion.

10. A method for securing a removable filter cartride to a filter housing, the method comprising:

inserting the removable filter cartridge into the housing;

aligning at least one feature of a distal end portion extending from a mounting member of the filter housing in at least one opening of an end portion of a center tube of a center tube/end cap assembly by rotating the filter cartridge in the housing, the end portion of the center tube being recessed within an opening of a filter media of the removable filter cartridge; and sealing an end cap of the removable filter cartridge to a base portion of the mounting member by aligning chamfered surfaces of the base portion with chamfered surfaces disposed about an opening of the end cap, the opening of the end cap receiving the distal end portion of the mounting member therein.

11. A method for securing a removable filter cartridge to a filter housing, the method comprising:

inserting the removable filter cartridge into the housing;

aligning at least one feature of a distal end portion extending from a mounting member of the filter housing in at least one opening of an end portion of a center tube of a center tube/end cap assembly by rotating the filter cartridge in the housing, the end portion of the center tube being recessed within an opening of a filter media of the removable filter cartridge, wherein the at least one opening of the end portion of the center tube is a slotted opening having a vertical portion and a horizontal portion, the horizontal portion allowing rotational movement of the filter cartridge within the filter housing and the horizontal portion allowing the at least one feature of the distal end portion extending from the mounting member to move therein, the horizontal portion being configured to allow a predetermined amount of rotational movement of the filter cartridge in the filter housing, the predetermined amount of rotational movement being less than an amount of rotational movement required to disengage a feature disposed on an upper surface of the filter housing.

12. A method for securing a removable filter cartridge to a filter housing, the method comprising:

inserting the removable filter cartridge into the housing;

aligning at least one feature of a distal end portion extending from a mounting member of the filter housing in at least one opening of an end portion of a center tube of a center tube/end cap assembly by rotating the filter cartridge in the housing, the end portion of the center tube being recessed within an opening of a filter media of the removable filter cartridge, wherein the at least one opening of the end portion of the center tube is a plurality of slotted openings each having a vertical portion and a horizontal portion, each of the slotted openings being configured to engage a complimentary feature of the distal end portion of the mounting member.

13. The method as in claim 12, wherein the orientation of the slotted openings and the respective complimentary feature of the distal end portion of the mounting member prevent an improper filter from being inserted into the filter housing.

14. The method as in claim 13, further comprising:

sealing an end cap of the removable filter cartridge to a base portion of the mounting member by aligning chamfered surfaces of the base portion with chamfered surfaces disposed about an opening of the end cap, the opening of the end cap receiving the distal end portion of the mounting member therein.

* * * * *